United States Patent [19]

Schade et al.

[11] 4,245,996
[45] Jan. 20, 1981

[54] CONDENSATION PRODUCTS OF TERPHENYLSULPHONIC ACIDS, NAPHTHALENESULPHONIC ACIDS, BIS-(4-HYDROXYPHENYL) SULPHONE AND FORMALDEHYDE

[75] Inventors: Franz Schade, Bergisch-Gladbach; Reinhard Nebeling, Leverkusen; Bruno Zinz, Cologne, all of Fed. Rep. of Germany

[73] Assignee: Bayer Aktiengesellschaft, Leverkusen, Fed. Rep. of Germany

[21] Appl. No.: 60,515

[22] Filed: Jul. 25, 1979

[30] Foreign Application Priority Data

Aug. 3, 1978 [DE] Fed. Rep. of Germany ....... 2834121

[51] Int. Cl.³ .................... C08G 16/02; D06P 5/02; C08G 14/06
[52] U.S. Cl. .................... 8/94.24; 252/8.57; 528/150; 528/265; 260/505 C
[58] Field of Search .................... 8/94.24; 252/8.57; 528/150, 265

[56] References Cited

U.S. PATENT DOCUMENTS

| 3,193,575 | 7/1965 | Nebel et al. | 260/505 C |
| 3,423,452 | 1/1969 | Lipowski | 8/94.24 |
| 3,906,037 | 9/1975 | Schade et al. | 8/94.24 |
| 3,973,904 | 8/1976 | Endres | 8/94.24 |
| 4,009,996 | 3/1977 | Wurmli | 8/94.24 |

FOREIGN PATENT DOCUMENTS 948695  2/1964  United Kingdom ............... 260/505 C

OTHER PUBLICATIONS

Chem. Abs. 141986m, vol. 75 (1971) Meister et al. "Dihydroxydiphenyl Sulfone-Formaldehyde Cond. Prod. Use Tanning".

*Primary Examiner*—Joseph L. Schofer
*Assistant Examiner*—Herbert J. Lilling
*Attorney, Agent, or Firm*—Sprung, Felfe, Horn, Lynch & Kramer

[57] ABSTRACT

Condensation products which are obtained by co-condensation, in an acid aqueous medium, of terphenylsulphonic acids, naphthalenesulphonic acid, bis-(4-hydroxyphenyl) sulphone and compounds which release formaldehyde are used as tanning agents for the production of leather and as re-tanning agents for re-tanning mineral-tanned leather.

5 Claims, No Drawings

CONDENSATION PRODUCTS OF TERPHENYLSULPHONIC ACIDS, NAPHTHALENESULPHONIC ACIDS, BIS-(4-HYDROXYPHENYL) SULPHONE AND FORMALDEHYDE

The present invention relates to water-soluble condensation products of terphenylsulphonic acids, naphthalenesulphonic acids, bis-(4-hydroxyphenyl) sulphone and formaldehyde or compounds which release formaldehyde, their preparation and their use as tanning agents for the production of leather and as re-tanning agents for re-tanning mineral-tanned leather.

The condensation products are characterised, in particular, in that they are prepared from the components in the molar ratio 1:0.2–2:0.3–3.5:0.65–5.2 in an acid aqueous medium.

The condensation reaction is carried out, for example, at 75°–130° C., preferably at 95°–115° C., whilst stirring.

When the co-condensation reaction has ended, the reaction products can be buffered to a pH value of 3.5–7 by adding aqueous alkali metal hydroxide solutions or ammonia solutions and can be isolated by evaporation in vacuo or by spray-drying.

Instead of pure bis-(4-hydroxyphenyl) sulphone, it is also possible to use crude bis-(4-hydroxyphenyl) sulphone which also contains small amounts of phenol and isomers of bis-(4-hydroxyphenyl) sulphone.

Formaldehyde can be employed in the form of aqueous solutions or as paraformaldehyde; instead of formaldehyde, it is also possible to use compounds which release formaldehyde, such as hexamethylenetetramine.

The terphenylsulphonic acids and naphthalenesulphonic acids can be prepared by known sulphonation processes. Sulphonation mixtures are preferably used for the condensation reaction.

The preparation process claimed has proved particularly economical if terphenyl isomer mixtures which are unavoidably obtained as by-products during the diphenyl synthesis of benzene and contain, in addition to the 3 terphenyl isomers, diphenyl and higher polyphenyls, are used for the sulphonation.

The preparation of suitable terphenylsulphonic acids is known, for example, from U.S. Pat. No. 2,004,546 and from J. Org. Chem. 14 (1949) page 163–168 and J. Org. Chem. 31 (1966) page 2,467–2,470.

Instead of pure naphthalene, it is also possible to use technical grades of naphthalene, for example so-called "hot-pressed cake". Suitable naphthalenesulphonic acids can be prepared, for example, by the process of German Patent Specification No. 611,671.

Sulphonic acids which are obtained by sulphonating terphenyl/naphthalene mixtures are preferably used in the condensation reaction. They are prepared, for example, by allowing 1.2–4.0 mols, preferably 1.8–3.5 mols, of a sulphonating agent, such as concentrated sulphuric acid (D 1.8), 20% strength oleum or chlorosulphonic acid to act on one mol of a terphenyl/naphthalene mixture at temperatures of 90°–160° C., preferably 120°–145° C., for 2–3 hours, whilst stirring.

The molar ratio of terphenylsulphonic acid to naphthalenesulphonic acid required for the co-condensation with bis-(4-hydroxyphenyl) sulphone and formaldehyde to give homogeneous, water-soluble co-condensates can vary within the limits 1:0.2–2.0, preferably 1:0.5–1.6, depending on the amount of bis-(4-hydroxyphenyl) sulphone which is to be co-condensed.

It is known that naphthalenesulphonic acids, preferably β-naphthalenesulphonic acid, can be condensed with bis-(4-hydroxyphenyl) sulphone and formaldehyde to give homogeneous water-soluble co-condensation products if not more than 1 mol of bis-(4-hydroxyphenyl) sulphone and appropriate amounts of formaldehyde are employed, per mol of naphthalenesulphonic acid, for the co-condensation reaction. The use of these products as tanning agents is known, for example from German Patent Specification No. 611,671 and German Patent Specification No. 617,015.

In contrast, in attempts to react terphenylsulphonic acids, instead of naphthalenesulphonic acids, with bis-(4-hydroxyphenyl) sulphone and formaldehyde under comparable conditions to give co-condensation products, inhomogeneous, water-insoluble condensation products which are suitable as tanning agents are formed.

Of the terphenylsulphonic acids, it is as yet known only that they can react with formaldehyde to give methylenebisterphenylsulphonic acids. The preparation and use of these products as re-tanning agents for mineral-tanned leather are described in DE-AS (German Published Specification) No. 1,806,536. However, in contrast to the co-condensation products of the present invention, they have no self-tanning action, that is to say they are not able to convert animal skin into leather.

It is thus surprising that homogeneous, water-soluble co-condensation products can be prepared when terphenylsulphonic acid and naphthalenesulphonic acid are simultaneously used for co-condensation with bis-(4-hydroxyphenyl) sulphone and formaldehyde.

After partial or complete neutralisation with aqueous alkali solution or ammonia solution and if appropriate evaporation to dryness or spray-drying, the co-condensation products according to the invention are outstandingly suitable as tanning agents for the production of white leather, which is fast to light, from hide material, but can furthermore also be used as re-tanning agents for re-tanning mineral-tanned leather, in particular for brightening and plumping chrome leathers.

EXAMPLE 1

230 g of terphenyl (industrial grade isomer mixture which is formed as a by-product in the preparation of diphenyl from benzene) are melted with 90 g of naphthalene at 120° C. in a closed stirred apparatus which is provided with a reflux condenser and thermometer. 372 g of sulphuric acid monohydrate (D 1.8) are then allowed to run in and sulphonation is carried out at 140° C. for 3 hours, whilst stirring continuously. The mixture is then allowed to cool to 110° C. and 300 g of water are allowed to run in slowly, if appropriate with external cooling. When the addition of water has ended, the temperature of the reaction mixture should be 95°–100° C. 250 g of bis-(4-hydroxyphenyl) sulphone are introduced at this temperature and 120 g of formaldehyde (30% strength) are then allowed to run in at 80° C. The condensation reaction is carried out at 115° C., whilst stirring continuously. During this co-condensation reaction, the bis-(4-hydroxyphenyl) sulphone dissolves completely and the viscosity of the reaction mixture rises with the increasing degree of condensation. After a condensation reaction of about 3–4 hours, the reaction product contains no further free formaldehyde and is now neutralised up to the desired pH value with aqueous alkali metal hydroxide solution or ammonia solution, depending on the intended use. If use as a replacement tanning agent is envisaged, the neutralisation is carried out, for example, up to a pH value of 3.5 with 45% strength aqueous sodium hydroxide solution. If the products are to be used for re-tanning mineral-tanned leather, the neutralisation with alkali is carried out up to a pH value of 6.5-7.0.

The solutions obtained in this manner, or the condensation products obtained in powder form therefrom by spray-drying, can be used, optionally together with aliphatic and/or aromatic monocarboxylic or dicarboxylic acids or in combination with other tanning agents, for self-tanning hide material or for re-tanning mineral-tanned leather. An outstanding plumpness and softness and an exceptionally good fastness to light are characteristic of the leathers tanned or re-tanned with these products.

EXAMPLE 2

(The percentage data in this example relate to the pelt weight)

Calf pelts produced from salted calfskins by methods customary in practice are treated, in a tanning drum, in 200% of a liquor which has a solids content of 25%, consisting of a condensation product prepared by a co-condensation reaction in the acid pH range according to Example 1, and which, specifically for use as a self-tanning agent, has been buffered to pH 3.5 with aqueous ammonia solution and adjusted to an acid number of 100 by adding glacial acetic acid. After a total tanning time of 6 hours, the tanning agent has been absorbed completely. After greasing, drying and mechanical working which are customary in practice, plump and soft leathers are obtained.

EXAMPLE 3

(The percentage data in this example relate to the shaved weight)

Cow-hide leathers of the same origin chrome-tanned in the manner customary in practice are shaved, after the chrome-tanning, to a thickness of 1.6-1.8 mm and, after rinsing thoroughly, are neutralised down to a pH value in the moist leather of 3.8-4.2 (determined by staining a cross-section of the leather with bromocresol green solution). At a liquor length of 100%, 5% of a condensation product which has been prepared, according to Example 1, specifically for use as a re-tanning agent for mineral-tanned leather and the solution of which has been buffered up to a pH value of 6.5 with aqueous ammonia solution and spray-dried is then allowed to act on the leathers in a rotating tanning drum. After about 30 minutes, the tanning agent has been completely absorbed by the leather. Dyeing and greasing is now carried out in the customary manner, if appropriate in the same bath. After drying and mechanical working which are customary in practice, plump and soft leathers with a very good brightening effect, excellent levelness and good fastness to light are obtained.

EXAMPLE 4

230 g of terphenyl (isomer mixture) and 64 g of naphthalene (hot-pressed cake) are melted at 120° C. and sulphonated with 301 g of sulphuric acid monohydrate at 140° C. for 3 hours, under the same conditions as described in Example 1. After cooling the reaction mixture to 120° C., it is diluted with 300 g of water. 200 g of bis-(4-hydroxyphenyl) sulphone are then introduced and the mixture is subjected to a condensation reaction with 105 g of formaldehyde (30% strength) at 100°-105° C. until the formaldehyde has been consumed without trace. Depending on the envisaged use, the reaction product is neutralised to pH 3.5 or 6.5 with aqueous ammonia solution and is spray-dried, if appropriate after adding glutaric acid, adipic acid or other organic acids which are solid under normal conditions, and after being adjusted to a concentration of about 50-55%.

EXAMPLE 5

730 g of a terphenyl-/naphthalene-sulphonic acid mixture which is formed by sulphonating 230 g of a terphenyl isomer mixture and 128 g of naphthalene "hot-pressed cake" with 372 g of sulphuric acid monohydrate at 145° C. in the course of 3 hours are reacted, after cooling and diluting, with 500 g of bis-(4-hydroxyphenyl) sulphone and 210 g of formaldehyde at 105°-110° C. in the course of about 10 hours in a three-necked flask, which is provided with a stirrer, reflux condenser and contact thermometer, to give a homogeneous water-soluble co-condensate. After buffering to pH 3.5 with ammonia and adjusting to an acid number of 120 (=mg of KOH/g, relative to 100% strength material), a tanning agent solution with excellent tanning properties for self-tanning is obtained. Leathers prepared with this tanning agent solution are plump, soft and very fast to light.

EXAMPLE 6

(a) 128 g of naphthalene are melted and are sulphonated with 140 g of sulphuric acid (100% pure) at about 145° C. for 2 hours.

(b) 230 g of technical grade terphenyl are melted and are sulphonated with 254 g of sulphuric acid (100% pure) at about 165° C. for 3 hours.

The mixtures of naphthalenesulphonic acids and terphenylsulphonic acids prepared under (a) and (b) are combined, cooled to 100° C., diluted with 450 g of water and, with the addition of 250 g of bis-(4-hydroxyphenyl) sulphone and 120 g of formaldehyde (30% strength), are subjected to a condensation reaction under reflux at about 110° C. for 5-6 hours.

The condensation product is adjusted to pH 3.5 with about 300 g of 25% strength aqueous ammonia and, if necessary after further dilution with water, is dried (spray-dried).

We claim:

1. Condensation products obtained by co-condensation, in an acid aqueous medium, of terphenylsulphonic acids, naphthalenesulphonic acids, bis-(4-hydroxyphenyl) sulphone and formaldehyde or compounds which release formaldehyde.

2. Condensation products according to claim 1, obtained by co-condensation of terphenylsulphonic acids, naphthalenesulphonic acids, bis-(4-hydroxyphenyl) sulphone and formaldehyde or compounds which release formaldehyde, in the molar ratio 1:0.2-2.0:0.3-3.5:0.65-5.2.

3. Condensation products according to claim 1, obtained by co-condensation at temperatures of 75°-130° C.

4. Condensation products according to claim 1, obtained from sulphonic acids which have been prepared by mixed sulphonation of terphenyl and naphthalene.

5. In the tanning of hides for the production of leather or the re-tanning of mineral-tanned leather employing a tanning agent, the improvement which comprises employing as said tanning agent a condensation product according to claim 1.

* * * * *